US007784600B2

(12) United States Patent
Weber

(10) Patent No.: US 7,784,600 B2
(45) Date of Patent: Aug. 31, 2010

(54) TRANSPORT APPARATUS WITH CHANGEABLE ANGLE BETWEEN INPUT AND OUTPUT STREAMS

(75) Inventor: Guenther Weber, Zachow (DE)

(73) Assignee: Weber Maschinenbau GmbH & Co. KG, Breidenbach (DE)

( * ) Notice: Subject to any disclaimer, the term of this patent is extended or adjusted under 35 U.S.C. 154(b) by 105 days.

(21) Appl. No.: 11/305,478

(22) Filed: Dec. 15, 2005

(65) Prior Publication Data

US 2006/0131133 A1 Jun. 22, 2006

(30) Foreign Application Priority Data

Dec. 16, 2004 (DE) .................. 10 2004 060 640

(51) Int. Cl.
*B65G 47/80* (2006.01)
(52) U.S. Cl. .................. 198/457.01; 198/457.05; 198/611; 198/434
(58) Field of Classification Search .......... 198/457.01, 198/457.05, 461.1
See application file for complete search history.

(56) References Cited

U.S. PATENT DOCUMENTS

| 1,489,926 | A | * | 4/1924 | Burtchaell | ............... | 198/461.1 |
| 2,580,054 | A | * | 12/1951 | Vincent | .................. | 198/457.05 |
| 3,065,671 | A | * | 11/1962 | Johnson et al. | .............. | 359/734 |
| 3,085,671 | A | * | 4/1963 | Pixley | .......................... | 198/434 |
| 4,373,431 | A | * | 2/1983 | Wallick et al. | ................. | 99/483 |
| 4,496,110 | A | * | 1/1985 | Raasch et al. | ............. | 242/473.4 |
| 4,549,647 | A | * | 10/1985 | Cosse | ...................... | 198/461.1 |
| 4,572,447 | A | * | 2/1986 | Raasch | ..................... | 242/473.4 |

FOREIGN PATENT DOCUMENTS

| DE | 908962 | B | | 7/1949 |
| DE | 2611354 | A1 | | 9/1977 |
| FR | 2233256 | A1 | | 1/1975 |
| GB | 503840 | | | 4/1939 |
| GB | 717723 | | | 11/1954 |
| JP | 61140411 | A | * | 6/1986 |
| JP | 5278842 | A | | 10/1993 |

* cited by examiner

*Primary Examiner*—Gene Crawford
*Assistant Examiner*—Kavel P Singh
(74) *Attorney, Agent, or Firm*—Townsend and Townsend and Crew, LLP

(57) ABSTRACT

An apparatus for the transport of food products, in particular of product slices produced with a cutting machine, comprising at least one deflection station for the deflection of at least one incoming product stream running in on an incoming conveyor into at least one outgoing product stream outgoing on an outgoing conveyor in a different direction to the incoming product stream, wherein the deflection station includes at least one transfer device movable between a discharge end of the incoming conveyor and a receiving end of the outgoing conveyor, with a support surface for the products always facing in at least approximately the same direction.

35 Claims, 2 Drawing Sheets

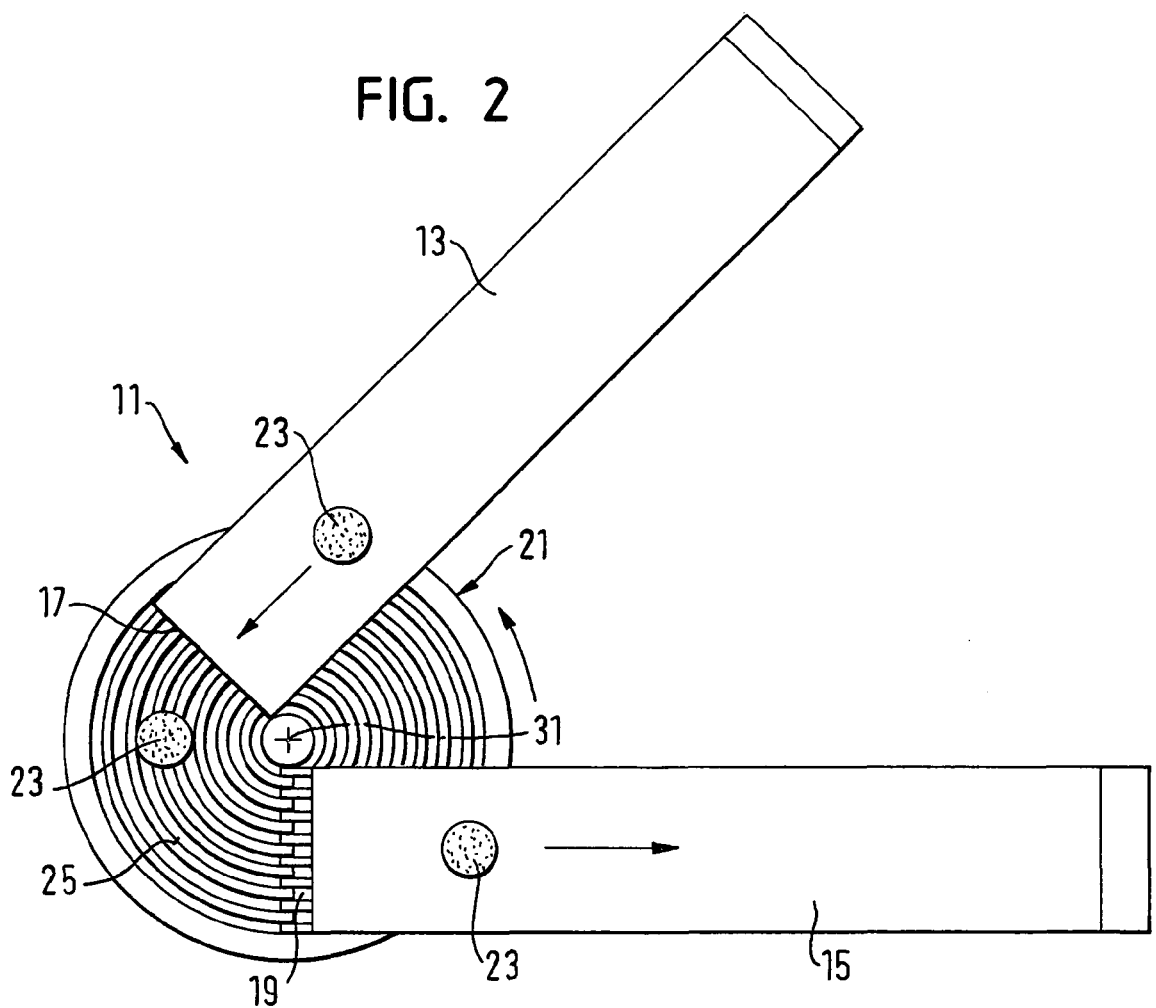
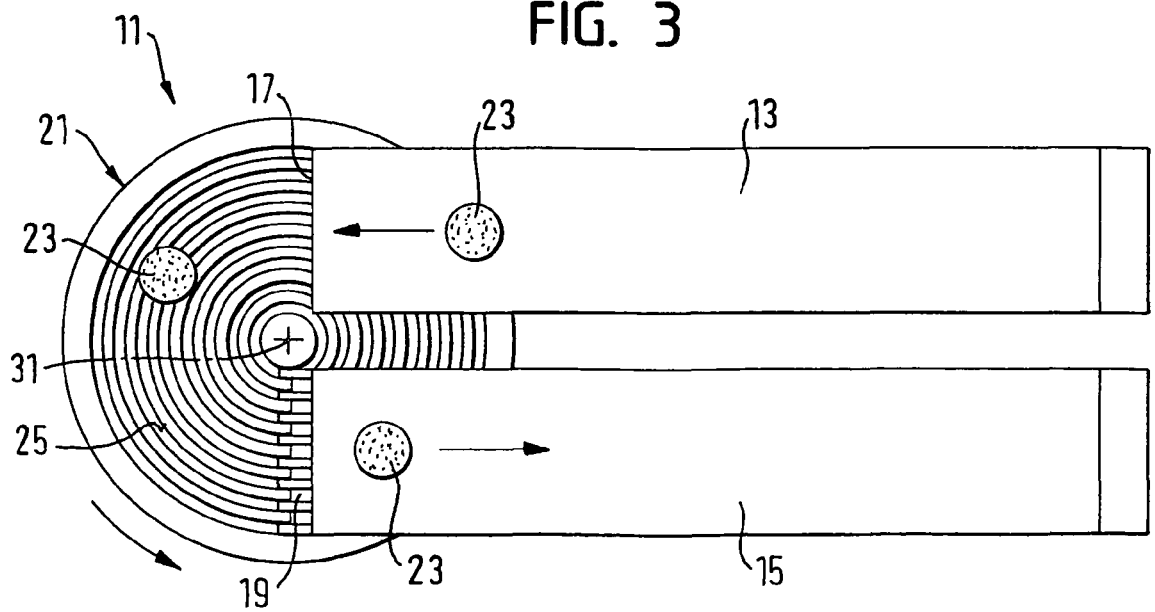

TRANSPORT APPARATUS WITH CHANGEABLE ANGLE BETWEEN INPUT AND OUTPUT STREAMS

CROSS-REFERENCE TO RELATED APPLICATIONS

This application claims the benefit of German Patent Application No. DE 10 2004 060 640.4, filed on Dec. 16, 2004, the disclosure of which is incorporated herein by reference.

FIELD OF THE INVENTION

The invention relates to an apparatus for the transport of food products, in particular of product slices produced by means of a cutting machine, comprising at least one deflection station for the deflection of at least one incoming product stream running in on an incoming conveyor into at least one outgoing product stream outgoing on an outgoing conveyor in a different direction to the incoming product stream.

BACKGROUND OF THE INVENTION

In the processing of food products—in particular in the transport of product slices produced by cutting product loaves (e.g. cheese, sausage, ham) by means of cutting machines also called slicers from the cutting machine to downstream processing stations, for example to a packaging machine—there is the need to be able to apply one or more changes of direction to the products during the transport. In practice, the food products are usually available in the form of a continuous product stream, or one that is only occasionally interrupted, of individual product slices or of product slices in stacked or overlapping portions.

For the realization of changes in direction, so-called curved belt conveyors or curved band conveyors are known which include one or more endless belts or link belts guided by rolls or rollers and each having an upper run and a lower run. The manufacturer of conveyors of this type is, however, complex and expensive and the operation of these conveyors is prone to problems. It is furthermore disadvantageous that in each case only a fixed deflection angle of typically 45° can be realized with curved belt conveyors of this type due to the design. It is furthermore disadvantageous that the deflection pulleys used are comparatively large due to the design, which results in problems on the transfer of relatively small product slices.

SUMMARY OF THE INVENTION

It is an object of the present invention to provide a simple possibility not prone to problems with respect to manufacture and operation for the deflection of product streams in particular in connection with transport apparatuses of the initially named kind.

The invention represents a moving away from the known curved belt conveyors in which the support surface is guided back as a lower run and faces downwardly in this process, i.e. in which only the region of the support surface currently used for the transport of the products faces upward. The previous association according to which the device providing the change of direction of the product stream has to fit precisely into the conveyor gap between the incoming conveyor and the outgoing conveyor is therefore overcome by the invention. Since, in accordance with the invention, the support surface of the transfer device always faces at least approximately in the same direction—that is, upward with a horizontally aligned support surface—the space disposed to the side next to the conveyor gap is utilized. The advantage hereby gained consists of being able to realize an extremely simply designed deflection device which is practically completely not prone to problems, which will be looked at in more detail below.

Although it is preferred for the total support surface of the transfer device always to lie in the same plane, i.e. to face precisely in the same direction at every time, differences in the orientation of individual regions of the support surface remaining within specific limits should explicitly also be covered by the invention, with a more or less opposite orientation, however,—such as with an upper run and a lower run of a curved belt conveyor—no longer lying within these limits.

A particular advantage of the invention consists of the fact that the transfer device can have an extremely simple structure, which goes hand in hand with an operation practically free of problems. In a particularly preferred embodiment, the transfer device includes a circular or annular disk or turntable. A turntable of this type can simply be arranged beneath the incoming conveyor and the outgoing conveyor such that the ends of the conveyors lie on the turntable or are located at a small spacing from its support surface for the products.

The products then move from the discharge end of the incoming conveyor to the turntable or disk rotating during operation and are taken up from this by the receiving end of the outgoing conveyor after they have covered a path corresponding to a specific angular region on the turntable and corresponding to the angular spacing between the two ends of the incoming conveyor and the outgoing conveyor.

Since a circular or annular turntable of this type does not have to be movable in itself and in particular does not have to be composed of a plurality of conveyor segments held movable relative to one another, a turntable made in one piece can be used and a deflection station of an extremely simple design can be realized in this manner.

The incoming conveyor and/or the outgoing conveyor are preferably provided in the form of an endless belt conveyor. The incoming conveyor, from which the products are discharged onto the transfer device of the deflection station, can include a single, wide endless belt which forms the total conveying width of the incoming conveyor. The outgoing conveyor, to which the products are transferred by the transfer device of the deflection station, is preferably made as a so-called multi-element strip conveyor which comprises a plurality of narrow endless belts or strips arranged spaced apart next to one another. The length of the conveyors can be variable.

To improve the reception of the products from the transfer device, provision can be made for the endless belts or strips to form the prongs of a fork-like or comb-like receiving end and to mesh with flutes or grooves formed in the transfer device, i.e. project into the flutes or grooves of the transfer device. The products can be taken up safely and reliably from the outgoing conveyor with a receiving end made in this manner; that is, they can literally be "scooped up".

Alternatively, a fork-like or comb-like embodiment of the receiving end of the outgoing conveyor can also be realized in that the receiving end is formed by rolls which are spaced apart from one another in accordance with the flute spacing and with which the receiving end of the outgoing conveyor rolls off into the flutes. This embodiment of the receiving end is generally independent of whether the outgoing conveyor is made as a multi-element strip conveyor or includes one or more wide endless belts.

Alternatively, the receiving end of the outgoing conveyor can simply be designed as a one-piece fork section or comb section without moving parts and which is adjoined by one or more endless bands arranged in parallel.

To realize the transfer of the products running in from the incoming conveyor to the transfer device as free of problems as possible, the discharge end of the incoming conveyor can reduce in height in the direction of the transfer device and can in particular converge like a wedge. The discharge end is preferably formed by a knife-like end piece with a preferably rounded end edge. An embodiment converging like a wedge can also be provided for the receiving end of the outgoing conveyor.

It can hereby be achieved that the conveyors are as flat as possible in the region of the transition to or from the transfer device and thus that the transfer of the products takes place as problem-free as possible.

Provision is furthermore preferably made for the change in direction for the product stream, which can be effected by means of the deflection station, to be changeable by adjustment of the conveyors relative to one another. The angle between the incoming product stream and the outgoing product stream is preferably adjustable between approximately 0° and 180°. The adjustment is preferably possible continuously.

A particularly flexible and universal use of the deflection station in accordance with the invention is thereby possible since any desired changes of direction or deflection angles can be realized.

The invention also relates to a deflection station for the deflection of at least one stream of food products, in particular of product slices produced by means of a cutting machine, comprising at least one incoming conveyor for an incoming product stream running in, at least one outgoing conveyor for an outgoing product stream outgoing in a different direction to the incoming product stream and at least one transfer device which is movable between a discharge end of the incoming conveyor and a receiving end of the outgoing conveyor, with a support surface always facing in at least approximately the same direction.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 2 and 3 illustrate the deflection station of FIG. 1 in plan view with different deflection angles.

DETAILED DESCRIPTION OF THE PREFERRED EMBODIMENTS

Figure 1:
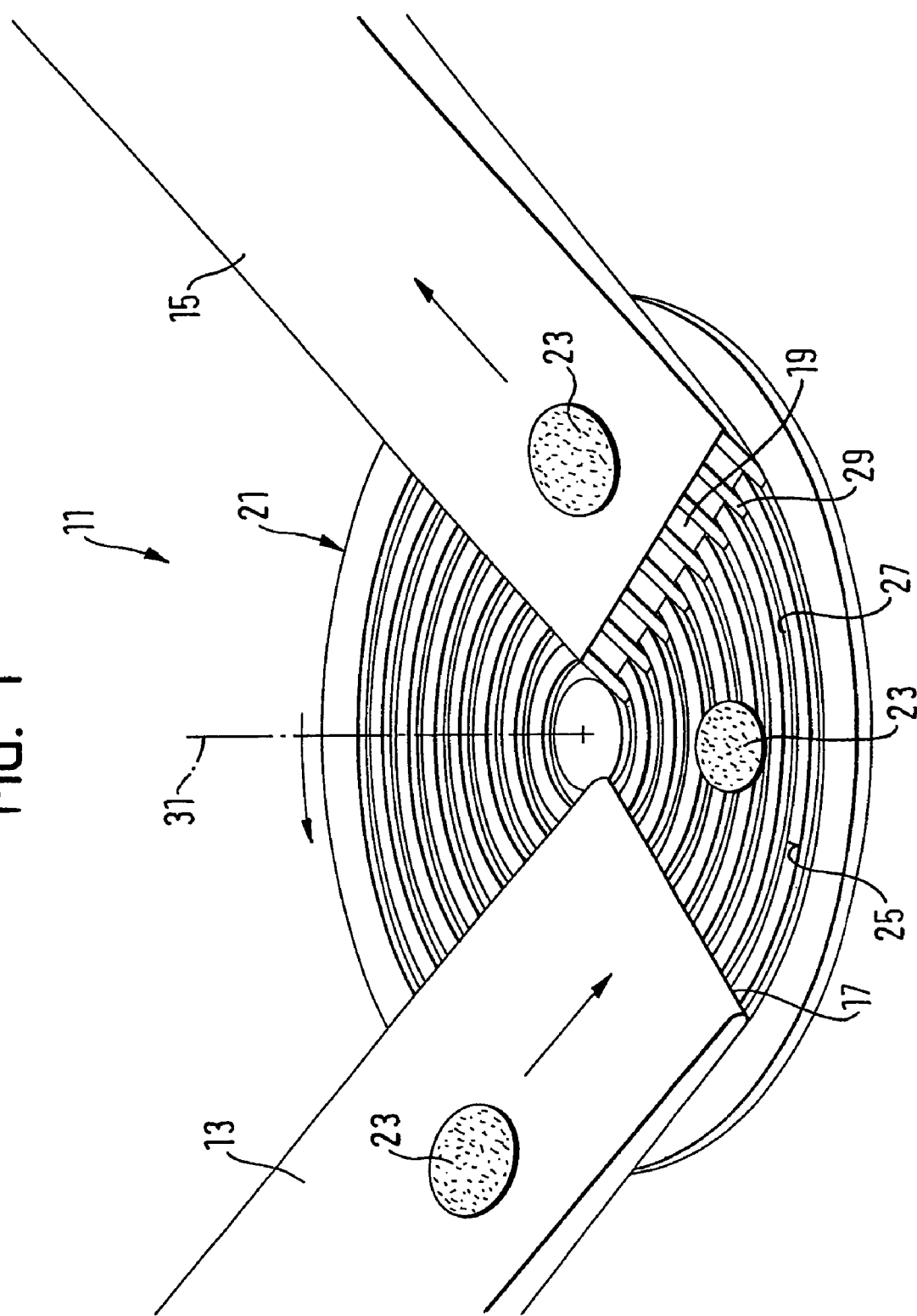
FIG. 1 is a perspective view of a deflection station.

The following description of the preferred embodiment(s) is merely exemplary in nature and is in no way intended to limit the invention, its application, or uses.

The deflection station 11 in accordance with the invention shown in FIGS. 1 to 3 is in particular used as a component of a transport apparatus not shown in any more detail for product slices, in particular in stacked or overlapping portions, produced by means of a cutting machine.

The cutting machine is arranged in front of an incoming conveyor 13 of the deflection station 11 in the conveying direction, whereas further transport devices, which supply the product slices 23 shown only schematically in the Figures to a packaging machine, for example, can adjoin an outgoing conveyor 15 of the deflection station 11.

The transport apparatus can include a plurality of deflection stations in accordance with the invention.

The actual deflection or change in direction of the incoming product stream running in on the incoming conveyor 13 takes place by a transfer device 21, which is made as a circular turntable or disk in the embodiment shown here and whose upper side provides a support surface 25 for the products 23. The turntable 21 can, for example, be provided simply in the form of a rigid plastic plate or metal plate.

The turntable 21 rotates during operation around an axis 31 extending perpendicular to the support surface 25 through the center at an angular speed matched to the transport speed of the conveyors 13, 15.

The upper side of the transfer device 21 is provided with annular, concentrically arranged grooves 27, separated by ridges located between the grooves, as seen in FIG. 1, with which a receiving section 19 meshes which is made in fork-like or comb-like form and forms the free end of the outgoing conveyor 15. As already mentioned in the introduction part, the prongs 29 of this fork or comb section 19 can be formed in the case of an outgoing conveyor 15 made as a multi-element strip conveyor by its narrow endless strips, by small rollers or simply by projections of a one-piece receiving section 19 having no moving parts projecting into the grooves 27.

As FIG. 1 shows, the incoming conveyor 13 and the outgoing conveyor 15 are each made to converge to a tip respectively in the direction of the turntable 21—viewed in a side view. It is achieved by this converging design that the conveyors 13, 15 are extremely flat in the transition region to the turntable 21 and the transition for the products 23 takes place as smoothly as possible.

The angle between the conveyors 13, 15 and the support surface 25 of the turntable 21 can generally be selected as desired. The products 23 can be transported in and away by means of the conveyors 13, 15 in a conveyor plane, in particular a horizontal conveyor plane, extending parallel to the support surface 25 of the conveyor 21, with the conveyors 13, 15, however, alternatively also being able to be extended and inclined toward the support surface 25.

FIGS. 2 and 3 show purely by way of example two possible angular positions of the conveyors 13, 15. The angle between the two conveyors 13, 15, i.e. the deflection angle or the change in direction, which can be given to the product steam by the deflection station 11 in accordance with the invention, can be set continuously.

For this purpose, at least one of the two conveyors 13, 15 supported relative to the turntable 21 preferably arranged in a stationary manner such that a tangential alignment of the conveyor 13, 15—with respect to the circular path of movement of the products 23 on the turntable 21—is ensured at any angular position.

FIG. 3 shows that a reversal of direction of the product stream running in on the incoming conveyor 13 is also possible by means of the deflection station 11 in accordance with the invention, i.e. that a deflection angle of 180° can also be realized.

During the transport operation, products 23 transported in by means of the incoming conveyor 13 are transferred to the turntable 21 of the deflection station 11 and, in this process, are placed gently onto the support surface 25 of the turntable 21 due to the acutely converging design of the discharge end 17. The products 23 are then transported lying on the turntable 21 rotating about the axis 31 on a circular path up to the receiving end 19 of the outgoing conveyor 15. A change in direction of the product stream running in on the incoming conveyor 13 takes place by an angle which corresponds to the angular distance between the discharge end 17 and the receiving end 19. At the receiving end 19, the products 23 are then "scooped up" reliably and gently due to this fork-like or comb-like embodiment and are transported away as an outgoing product stream on the outgoing conveyor 15 in a transport direction changed with respect to the incoming product stream. In contrast e.g. to a curved belt conveyor, such as was initially mentioned, the support surface 25 for the products 23 active between the two conveyors 13, 15, which is endless, viewed in the direction of movement of the products 23, is not, for instance, guided back as a lower run after reaching the receiving end 19, but it rather continues to move in the transport plane in the region next to the "conveyor gap" between the two conveyors 13, 15 back to the discharge end 17 of the incoming conveyor 13. The contact surface 25 therefore always faces in the same direction.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A deflection station for the deflection of at least one stream of food product slices produced by means of a cutting machine, comprising:
    a rotatable disk;
    at least one incoming conveyor for an incoming product stream running-in;
    at least one outgoing conveyor for an outgoing product stream outgoing in a different direction to the incoming product stream,
    at least one of the incoming and outgoing conveyors converging in a longitudinal direction towards the rotatable disk into a tip; and
    the disk being rotatably movable between a discharge end of the incoming conveyor and a receiving end of the outgoing conveyor and defining a support surface that always faces in at least approximately the same direction and that is formed by a plurality of spaced-apart, alternating circular ridges and flutes, and
    wherein the receiving end of the at least one outgoing conveyor and incoming conveyor is made in fork-like form and meshes with the flutes and ridges of the rotatable disk.

2. A deflection station in accordance with claim 1, wherein movement of the rotatable disk includes one of a rotary or a pivot movement.

3. A deflection station in accordance with claim 2, wherein an axis of the movement extends at least substantially perpendicular to the support surface.

4. A deflection station in accordance with claim 1, wherein the rotatable disk is arranged beneath the discharge and receiving ends of the conveyors.

5. A deflection station in accordance with claim 1, wherein the rotatable disk includes a circular or annular turntable.

6. A deflection station in accordance with claim 5, wherein one of the radius and the width of the turntable corresponds at least approximately to the width of one of the incoming and the outgoing conveyor.

7. A deflection station in accordance with claim 1, wherein at least one of the incoming conveyor and the outgoing conveyor extends at least substantially tangentially to the path of movement of the products on the rotatable disk at least in the region of the rotatable disk.

8. A deflection station in accordance with claim 1, wherein at least one of the incoming conveyor and the outgoing conveyor is provided in the form of an endless belt conveyor.

9. A deflection station in accordance with claim 1, wherein the outgoing conveyor includes a plurality of narrow endless belts arranged spaced apart next to one another and made as a multi-element strip conveyor.

10. A deflection station in accordance with claim 1, wherein prongs of a fork-like receiving end of the outgoing conveyor are formed by endless strips.

11. A deflection station in accordance with claim 1, wherein prongs of a fork-like receiving end of the outgoing conveyor are formed by rollers.

12. A deflection station in accordance with claim 1, wherein the receiving end of the outgoing conveyor is made as a rigid fork section without moving parts and is adjoined by at least one endless band arranged in parallel.

13. A deflection station in accordance with claim 1, wherein the discharge end of the incoming conveyor is formed by a knife-like end piece with a rounded end edge.

14. A deflection station in accordance with claim 1, wherein a conveyor width of the incoming conveyor is made by a single, wide endless band.

15. A deflection station in accordance with claim 1, wherein the change in direction for the product stream which can be effected by means of the rotatable disk can be changed by adjustment of the conveyors relative to one another.

16. An apparatus in accordance with claim 1, wherein an angle between the incoming product stream and the outgoing product stream is adjustable and said angle can be set between approximately 0° and 180°.

17. A deflection station in accordance with claim 16, wherein the angle is greater than 0° and less than 180°.

18. An apparatus for the transport of food product slices comprising:
    at least one deflection station that deflects at least one incoming product stream running on an incoming conveyor into at least one outgoing product stream outgoing on an outgoing conveyor in a different direction to the incoming product stream, the deflection station including a disk rotatably movable between a discharge end of the incoming conveyor and a receiving end of the outgoing conveyor and having a support surface defined by a plurality of parallel, circular ridges spaced apart by flutes which are parallel to the ridges so that the products on the support surface always face in at least approximately the same direction; and
    at least one of the receiving end of the outgoing conveyor or of the discharge end of the incoming conveyor converging into a tip towards the rotatable disk and having fork-like prongs that mesh with the flutes in the rotatable disk.

19. An apparatus in accordance with claim 18, wherein movement of the rotatable disk includes one of a rotary or a pivot movement.

20. An apparatus in accordance with claim 19, wherein an axis of the movement extends at least substantially perpendicular to the support surface.

21. An apparatus in accordance with claim 18, wherein the rotatable disk is arranged beneath the discharge and receiving ends of the conveyors.

22. An apparatus in accordance with claim 18, wherein the rotatable disk defines a circular or annular turntable.

23. An apparatus in accordance with claim 22, wherein one of the radius and the width of the turntable corresponds at least approximately to the width of one of the incoming or the outgoing conveyor.

24. An apparatus in accordance with claim 18, wherein at least one of the incoming conveyor or the outgoing conveyor extends at least substantially tangentially to the path of movement of the products on the rotatable disk at least in the region of the rotatable disk.

25. An apparatus in accordance with claim 18, wherein at least one of the incoming conveyor or the outgoing conveyor is provided in the form of an endless belt conveyor.

26. An apparatus in accordance with claim 18, wherein the outgoing conveyor includes a plurality of narrow endless belts arranged spaced apart next to one another and is made as a multi-element strip conveyor.

27. An apparatus in accordance with claim 18, wherein prongs of a fork-like receiving end of the outgoing conveyor are formed by endless strips.

28. An apparatus in accordance with claim 18, wherein prongs of a fork-like receiving end of the outgoing conveyor are formed by rollers.

29. An apparatus in accordance with claim 18, wherein the receiving end of the outgoing conveyor is made as a rigid fork section without moving parts and is adjoined by at least one endless band arranged in parallel.

30. An apparatus in accordance with claim 18, wherein the discharge end of the incoming conveyor reduces in height in the direction of the rotatable disk and converges like a wedge, with the discharge end being formed by a knife-like end piece with a rounded end edge.

31. An apparatus in accordance with claim 18, wherein a conveyor width of the incoming conveyor is made by a single, wide endless band.

32. An apparatus in accordance with claim 18, wherein the change in direction for the product stream which can be effected by means of the rotatable disk can be changed by adjustment of the conveyors relative to one another.

33. An apparatus in accordance with claim 18, wherein an angle between the incoming product stream and the outgoing product stream is adjustable and said angle can be set between approximately 0° and 180°.

34. An apparatus in accordance with claim 33, wherein the angle is greater than 0° and less than 180°.

35. An apparatus for the transport of relatively soft food product slices comprising:

a rotatable disk;

spaced-apart incoming and outgoing conveyors for supporting the product slices, the conveyors having respective discharge and receiving ends that extend in different directions, each conveyor defining a conveying surface having a width greater than the transverse dimensions of the product slices carried by it so that the relatively soft slices are fully supported by the conveying surface, a thickness perpendicular to the width and the length, and at least one of the discharge or receiving ends having a diminishing thickness that converges towards the rotatable disk into a tip, the tip of the at least one conveyor forming spaced-apart, fork-like prongs; and the rotatable disk having a flat, product supporting surface of a width greater than the transverse dimensions of the product slices and defined by a plurality of alternating ridges and flutes concentrically arranged about an axis of rotation of the disk so that the relatively soft product slices are fully supported by the product supporting surface, the disk being disposed between the discharge and receiving ends of the respective conveyors and arranged so that the fork-like prongs of at least one conveyor extend into the flutes on the supporting surface of the disk.

* * * * *

UNITED STATES PATENT AND TRADEMARK OFFICE
CERTIFICATE OF CORRECTION

PATENT NO. : 7,784,600 B2 Page 1 of 1
APPLICATION NO. : 11/305478
DATED : August 31, 2010
INVENTOR(S) : Guenther Weber It is certified that error appears in the above-identified patent and that said Letters Patent is hereby corrected as shown below:

On the Title Page, Item (30) Foreign Application Priority Data:

Delete "10 2004 060 640"

and replace it with --10 2004 060 640.4--

Signed and Sealed this

Second Day of November, 2010

David J. Kappos
*Director of the United States Patent and Trademark Office*